United States Patent [19]

Yamamoto et al.

[11] Patent Number: 5,385,988

[45] Date of Patent: Jan. 31, 1995

[54] COMPOSITE COMPOSITION HAVING HIGH TRANSPARENCY AND PROCESS FOR PRODUCING SAME

[75] Inventors: Naoki Yamamoto; Akira Nakata; Hiroki Hatakeyama; Hiroyuki Watanabe, all of Hiroshima, Japan

[73] Assignee: Mitsubishi Rayon Co., Ltd., Tokyo, Japan

[21] Appl. No.: 948,421

[22] Filed: Sep. 22, 1992

[30] Foreign Application Priority Data

| Sep. 24, 1991 | [JP] | Japan | 3-243397 |
| Sep. 24, 1991 | [JP] | Japan | 3-243398 |
| Sep. 24, 1991 | [JP] | Japan | 3-243401 |
| Sep. 24, 1991 | [JP] | Japan | 3-243402 |
| Sep. 24, 1991 | [JP] | Japan | 3-243403 |

[51] Int. Cl.$^6$ ............ C08F 292/00; C08G 77/02
[52] U.S. Cl. ................ 525/479; 523/209; 528/25; 528/26
[58] Field of Search ........ 525/479; 523/209; 428/404, 405, 407; 528/25, 26

[56] References Cited

U.S. PATENT DOCUMENTS

| 3,324,074 | 6/1967 | McManimie | 526/279 |
| 3,692,816 | 9/1972 | Faille et al. | 525/479 |
| 3,904,568 | 9/1975 | Yamaguchi et al. | 523/209 |
| 4,624,971 | 11/1986 | van Tao et al. | 525/479 |

FOREIGN PATENT DOCUMENTS

| 600976 | 7/1960 | Canada | 523/209 |
| 0399148 | 11/1990 | European Pat. Off. . | |
| 0433906 | 6/1991 | European Pat. Off. . | |
| 1456865 | 12/1976 | United Kingdom | 523/209 |
| 1214685 | 2/1986 | U.S.S.R. | 523/209 |
| WO90/06328 | 6/1990 | WIPO . | |

OTHER PUBLICATIONS

Chemical Abstracts, AN 68893g, vol. 100, No. 10, Mar. 1984, S. S. Ivanchev, et al., "Graft Polymerization of Methyl Methacrylate with Colloidal Silica–Modified by (Methacryloyloxymethyl)Methyldi=Ethoxysilane".

Database WPIL, Feb. 17, 1988, Derwent Publications, Ltd., AN 87-352671, & JP-A-62 256 874, "UV Ray–Curable Resin Compsn. Prepn.—from Alkoxysilane Cpd. Hydrolysate, Colloidal Silica Dispersed in Organic Solvent, Polyfunctional Meth)Acrylate Cpd. and Initiator".

Journal of Applied Polymer Science, vol. 37, No. 10, May 20, 1989, pp. 2921–2931, M. Chaimberg, et al., "Graft Polymerization of Polyvinylpyrrolidone onto Silica".

*Primary Examiner*—Ralph H. Dean
*Attorney, Agent, or Firm*—Oblon, Spivak, McClelland, Maier & Neustadt

[57] ABSTRACT

Disclosed is a composite composition obtained by polymerizing a radical-polymerizable vinyl compound (A) in the presence of a silica polycondensate (B) formed by hydrolysis and polycondensation of at least one alkoxysilane compound in a dispersion system of colloidal silica. This composite composition has high transparency, rigidity, toughness and thermal resistance and is hence useful in applications where inorganic glass has heretofore been used.

17 Claims, No Drawings

COMPOSITE COMPOSITION HAVING HIGH TRANSPARENCY AND PROCESS FOR PRODUCING SAME

BACKGROUND OF THE INVENTION
1. Field of the Invention

This invention relates to composite compositions having high transparency, rigidity, toughness and thermal resistance.

2. Description of the Prior Art

Generally, organic polymers have low rigidity, hardness and thermal resistance. In an attempt to overcome this disadvantage, many investigations have heretofore been made on the formation of composite materials consisting of organic polymers and inorganic substances. For example, there have been proposed a number of methods in which a dispersion of a silica compound (formed by polycondensation of an alkoxysilane) or colloidal silica in an acrylic resin solution is used as a coating film for hardening the surfaces of plastic substrates (see, for example, Japanese Patent Laid-Open Nos. 11952/'78 and 11989/'78).

However, when such a composite material is coated on plastic substrates, a coating film having high hardness and high wear resistance is obtained, but no substantial improvement in rigidity can be expected. Moreover, good transparency is obtained at coating film thicknesses of the order of several tens of microns, but a marked reduction in transparency results at greater coating film thicknesses.

On the other hand, it is described in J. Mater. Res., Vol. 4, p. 1018 (1989) that a silica gel-polymethyl methacrylate composite material having high transparency is obtained by impregnating porous silica gel having a controlled pore diameter with methyl methacrylate monomer and then polymerizing the latter. However, this method has the disadvantage that it involves troublesome steps and is not suitable for industrial purposes and that it is difficult to subject the resulting composite material to postworking.

SUMMARY OF THE INVENTION

It is an object of the present invention to provide a composite composition to which high rigidity and high thermal resistance have been imparted without impairing the high transparency, high toughness, low specific gravity and good workability inherently possessed by acrylic resins.

According to the present invention, there is provided composite composition obtained by polymerizing a radical-polymerizable vinyl compound (A) in the presence of a silica polycondensate formed by hydrolysis and polycondensation of at least one silane compound of the general formula

$$SiR^1{}_aR^2{}_b(OR^3)_c \qquad (I)$$

where $R^1$ and $R^2$ are hydrocarbon radicals of 1 to 10 carbon atoms which may contain an ether linkage, ester linkage or carbon-to-carbon double bond, $R^3$ is a hydrogen atom or a hydrocarbon radical of 1 to 10 carbon atoms which may contain an ether linkage, ester linkage or carbon-to-carbon double bond, a and b are whole numbers of 0 to 3, and c is equal to (4-a-b) and represents a whole number of 1 to 4, a dispersion system of colloidal silica.

DETAILED DESCRIPTION OF THE PREFERRED EMBODIMENTS

In the composite compositions of the present invention, the silica skeleton of a silica polycondensate derived from colloidal silica and at least one silane compound hydrolyzed and polycondensed on the surfaces thereof, and a polymer of a radical-polymerizable vinyl compound form a semi-interpenetrating network structure. Accordingly, the composite compositions of the present invention exhibit very high rigidity, toughness and thermal resistance. Moreover, since the present invention permits colloidal silica particles to be incorporated in the silica skeleton and uniformly dispersed therein, they also exhibit very high transparency.

As the radical-polymerizable vinyl compound (A) used the present invention, there may be employed a variety of well-known radical-polymerizable monomers. Useful radical-polymerizable monomers include, for example, methacrylic esters such as methyl methacrylate, ethyl methacrylate, butyl methacrylate and 2-ethylhexyl methacrylate; acrylic esters such as methyl acrylate, ethyl acrylate, butyl acrylate and 2-ethylhexyl acrylate; unsaturated carboxylic acids such as acrylic acid, methacrylic acid, maleic acid and itaconic acid; acid anhydrides such as maleic anhydride and itaconic anhydride; maleimide derivatives such as N-phenylmaleimide, N-cyclohexylmaleimide and N-t-butylmaleimide; hydroxyl-containing monomers such as 2-hydroxyethyl acrylate, 2-hydroxypropyl acrylate, 2-hydroxyethyl methacrylate and 2-hydroxypropyl methacrylate: nitrogen-containing monomers such as acrylamide, methacrylamide, acrylonitrile, methacrylonitrile, diacetone acrylamide and dimethylaminoethyl methacrylate; epoxy-containing monomers such as allyl glycidyl ether, glycidyl acrylate and glycidyl methacrylate; styrene monomers such as styrene and α-methylstyrene; and crosslinking agents such as ethylene glycol diacrylate, ethylene glycol dimethacrylate, allyl acrylate, allyl methacrylate, divinylbenzene and trimethylolpropane triacrylate. Among these monomers, methacrylic esters and acrylic esters are preferred. In the radical-polymerizable vinyl compound (A), at least one monomer selected from methacrylic esters and acrylic esters is preferably present in an amount of not less than 50% by weight and more preferably in an amount of not less than 70% by weight. Especially preferred monomers for use as the radical-polymerizable vinyl compound (A) are methacrylic esters.

Moreover, vinyl compounds having in the molecule at least one group reactive with the silanol groups contained in the silica polycondensate (B) (i.e., at least one functional group selected from the class consisting of hydroxyl, carboxyl, halogenated silyl and alkoxysilyl groups) function to further improve some properties (such as rigidity, toughness and thermal resistance) of the resulting composite composition. Accordingly, it is preferable that such a vinyl compound be contained as a component of the radical-polymerizable vinyl compound (A).

Such vinyl compounds having a reactive group in the molecule include, for example, 2-hydroxyethyl (meth)acrylate, 2-hydroxypropyl (meth)acrylate, (meth)acrylic acid, vinyltrichlorosilane, vinyltrimethoxysilane and γ-methacryloyloxypropyltrimethoxysilane. Among these vinyl compounds, 2-hydroxyethyl methacrylate, methacrylic acid, vinyltrichlorosilane, vinyltrimethoxysilane and γ-methacryloyloxypropyltrimethoxysilane are especially preferred.

The silica polycondensate (B) used in the present invention is a product obtained by hydrolysis and polycondensation of at least one silane compound of the general formula $$SiR^1_a R^2_b (OR^3)_c \qquad (I)$$

where $R^1$ and $R^2$ are hydrocarbon radicals of 1 to 10 carbon atoms which may contain an ether linkage, ester linkage or carbon-to-carbon double bond, $R^3$ is a hydrogen atom or a hydrocarbon radical of 1 to 10 carbon atoms which may contain an ether linkage, ester linkage or carbon-to-carbon double bond, a and b are whole numbers of 0 to 3, and c is equal to (4-a-b) and represents a whole number of 1 to 4, in a dispersion system of colloidal silica. During this reaction, most of the $OR^3$ groups contained in the silane compound are hydrolyzed, but some $OR^3$ groups, or some $OR^3$ and OH groups, still remain on the outer surfaces of the silica polycondensate (B). Therefore, the silica polycondensate (B) dissolves in the radical-polymerizable vinyl compound (A).

The above-described silica polycondensate (B) can be uniformly dispersed in the radical-polymerizable vinyl compound (A) even at such silica concentrations that the dispersion of colloidal silica alone in the radical-polymerizable vinyl compound (A) would cause gelation. That is, the present invention makes it possible to disperse a high concentration of silica uniformly in the resulting composite composition and hence impart desired properties thereto.

As the dispersion of colloidal silica used in the present invention, there may employed a variety of commercial products. The particle diameter of colloidal silica usually ranges from 1 nm to 1 μm, but no particular imitation is placed on the particle diameter. However, preferred particle diameters are within the range of 5 to 500 nm. Although no particular limitation is placed on the dispersion medium for colloidal silica, water, alcohols (such as methanol and isopropyl alcohol), cellosolves, dimethylacetamide and the like are usually used. Especially preferred dispersion media are alcohols, cellosolves and water.

Among the silane compounds within the scope of the above general formula (I), silane compounds represented by the following general formulas (II) to (VII) are preferred.

$$SiR^4_a R^5_b (OR^6)_c \qquad (II)$$

$$SiR^4_n(O\text{—}CH_2CH_2\text{—}O\text{—}CO\text{—}(R^7)C\text{=}CH_2)_{4-n} \qquad (III)$$

$$CH_2\text{=}C(R^7)COO(CH_2)_p SiR^8_n (OR^6)_{3-n} \qquad (IV)$$

$$CH_2\text{=}CHSiR^8_n (OR^6)_{3-n} \qquad (V)$$

$$HS(CH_2)_p SiR^8_n (OR^6)_{3-n} \qquad (VI)$$

and

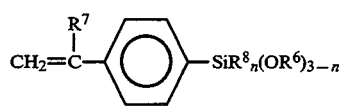
(VII)

where $R^4$ and $R^5$ are hydrocarbon radicals of 1 to 10 carbon atoms which may contain an ether linkage or ester linkage, $R^6$ is a hydrogen atom or a hydrocarbon radical of 1 to 10 carbon atoms, $R^7$ is a hydrogen atom or a methyl group, $R^8$ is an alkyl group of 1 to 3 carbon atoms or a phenyl group, a and b are whole numbers of 0 to 3, c is equal to (4-a-b) and represents a whole number of 1 to 4, n is a whole number of 0 to 2, and p is a whole number of 1 to 6.

The silane compounds represented by the above general formula (II) include, for example, tetramethoxysilane, tetraethoxysilane, tetrapropoxysilane, tetrabutoxysilane, methyltriethoxysilane, ethyltrimethoxysilane, ethyltriethoxysilane, phenyltrimethoxysilane, phenyltriethoxysilane, dimethyldimethoxysilane, diphenyldimethoxysilane, methylethyldiethoxysilane, methylphenyldimethoxysilane, trimethylethoxysilane, methoxyethyltriethoxysilane, acetoxyethyltriethoxysilane, diethoxyethyldiethoxysilane, tetraacetoxysilane, methyltriacetoxysilane, tetrakis(2-methoxyethoxy)silane and partial hydrolyzates thereof. The silane compounds represented by the above general formula (III) include, for example, tetrakis(acryloyloxyethoxy)silane, tetrakis(methacryloyloxyethoxy)silane, methyltris(acryloyloxyethoxy)silane and methyltris(methacryloyloxyethoxy)silane. Among them, tetrakis(acryloyloxyethoxy)silane and tetrakis(methacryloyloxyethoxy)silane are preferred. These silane compounds can be synthesized, for example, from tetrachlorosilane and 2-hydroxyethyl acrylate or 2-hydroxyethyl methacrylate. The silane compounds represented by the above general formula (IV) include, for example, β-acryloyloxyethyldimethoxymethylsilane, γ-acryloyloxypropylmethoxydimethylsilane, γ-acryloyloxypropyltrimethoxysilane, β-methacryloyloxyethyldimethoxymethylsilane, γ-methacryloyloxypropylmethoxydimethylsilane and γ-methacryloyloxypropyltrimethoxysilane. The silane compounds represented by the above general formula (V) include, for example, vinylmethyldimethoxysilane, vinyltrimethoxysilane and vinyltriethoxysilane. The silane compounds represented by the above general formula (VI) include, for example, γ-mercaptopropyldimethoxymethylsilane and γ-mercaptopropyltrimethoxysilane. The silane compounds represented by the above general formula (VII) include, for example, p-vinylphenylmethyldimethoxysilane and p-vinylphenyltrimethoxysilane.

In the practice of the present invention, the silane compounds represented by the above general formulas (II) to (VII) are preferably used in any of the following five embodiments.

In a first embodiment, at least one silane compound of the above general formula (II) is used.

In this embodiment, it is preferable to use silane compounds of the above general formula (II) in which $R^4$, $R^5$ and $R^6$ are hydrocarbon radicals of 1 to 4 carbon atoms. Where $R^4$, $R^5$ and $R^6$ are hydrocarbon radicals of 4 or less carbon atoms, no significant steric hindrance results. Accordingly, the hydrolysis and polycondensation rate becomes so high that colloidal silica particles are readily bonded together to form a silica skeleton. Especially preferred silane compounds are tetraalkoxysilanes of the above general formula (II) in which c is equal to 4. In this case, tetraalkoxysilanes are preferably used either alone or in admixture with trialkoxysilanes or dialkoxysilanes to improve stability prior to polymerization.

In a second embodiment, at least one silane compound of the above general formula (III) is used.

When silane compounds of the general formula (III) are hydrolyzed and polycondensed, some acryloyloxyethoxy or methacryloyloxyethoxy groups are not hydrolyzed and remain in the silica polycondensate (B). During polymerization, these unhydrolyzed acryloyloxyethoxy or methacryloyloxyethoxy groups copolymerize with the radical-polymerizable vinyl compound (A) and chemically combines therewith, thus serving to reinforce the interface between the polymer of the radical-polymerizable vinyl compound (A) and the silica polycondensate (B).

When the radical-polymerizable vinyl compound (A) is polymerized in the presence of the silica polycondensate (B), some of the unhydrolyzed acryloyloxyethoxy or methacryloyloxyethoxy groups may be eliminated owing to further polycondensation of the silica polycondensate (B). Even in this case, the eliminated groups copolymerize with the radical-polymerizable vinyl compound (A) and do not form any volatile component. Accordingly, the finally obtained composite compositions will not suffer foaming, cracking or fracture.

In a third embodiment, at least one silane compound of the above general formula (II) and at least one silane compound of the above general formula (III) are used in combination.

Where these two types of silane compounds are used in combination, the resulting silica polycondensate (B) not only shows the above-described effects produced when each type of silane compound is used alone, but also has resistance to hydrolysis because the silane compound of the general formula (III) is sterically crowded around the silicon atom. Thus, the combined use of these two types of silane compounds is effective in keeping the silica polycondensate (B) stable till the polymerization procedure which will be described later.

In a fourth embodiment, at least one silane compound of any of the above general formulas (IV) to (VII) is used.

Since silane compounds of the general formulas (IV) to (VII) and their hydrolyzates also act as copolymerizable monomers or chain transfer agents during polymerization of the radical-polymerizable vinyl compound (A), they serve to reinforce the interface between the polymer of the radical-polymerizable vinyl compound (A) and the silica polycondensate (B) and thereby impart good properties to the finally obtained composite compositions.

In the fifth embodiment, at least one silane compound of the above general formula (II) and at least one silane compound of any of the above general formulas (IV) to (VII) are used in combination.

Where these two types of silane compounds are used in combination, the silane compound of any of the general formulas (IV) to (VII) is incorporated in the silica skeleton formed from the silane compound of the general formula (II) as described above in connection with the first embodiment. Thus, a stronger bond is produced between the polymer of the radical-polymerizable vinyl compound (A) and the silica polycondensate (B) to impart good properties to the finally obtained composite compositions.

In order to form the silica polycondensate (B) by hydrolysis and polycondensation of the above-defined silane compound in a dispersion system of colloidal silica, the silane compound may be used alone or in combination with a minor amount of a component co-condensable therewith. Useful components co-condensable with the above-enumerated silane compounds include, for example, metallic alkoxides, organic metallic salts and metallic chelates. Such co-condensable components are preferably used in an amount of 0 to 100 parts by weight, more preferably 0 to 50 parts by weight, per 100 parts by weight of the silane compound.

Specific examples of such co-condensable metallic alkoxides, organic metallic salts and metallic chelates include titanium tetraethoxide, titanium tetraisopropoxide, zirconium tetraethoxide, zirconium tetra-n-butoxide, aluminum triisopropoxide, zinc acetylacetonate, lead acetate and barium oxalate.

In the hydrolysis and polycondensation reaction of the silane compound, water needs to be present in the reaction system. Generally, the proportion of water present in the reaction system exerts no significant influence on the reaction rate. However, if the amount of water is extremely small, the hydrolysis is too slow to form a polycondensate.

In the hydrolysis reaction of the silane compound, an inorganic or organic acid can be used as a catalyst. Useful inorganic acids include, for example, hydrohalogenic acids (such as hydrochloric acid, hydrofluoric acid and hydrobromic acid), sulfuric acid, nitric acid and phosphoric acid. Useful organic acids include, for example, formic acid, acetic acid, oxalic acid, acrylic acid and methacrylic acid.

In the reaction system for hydrolysis of the silane compound, a solvent may be used in order to effect the reaction mildly and uniformly. It is desirable that the solvent allows the reactant (i.e., silane alkoxide), water and the catalyst to be intermixed. Useful solvents include, for example, water; alcohols such as methyl alcohol, ethyl alcohol and isopropyl alcohol; ketones such as acetone and methyl isobutyl ketone; and ethers such as tetrahydrofuran and dioxane. For this purpose, the above-described dispersion medium for colloidal silica may be used as it is, or any necessary amount of solvent may be added anew. No particular limitation is placed on the amount of solvent used, so long as the reactant can be dissolved homogeneously. However, if the concentration of the reactant is too low, the reaction rate may become unduly slow. The hydrolysis and polycondensation reaction of the silane compound is usually carried out at a temperature ranging from room temperature to about 120° C. for a period of about 30 minutes to about 24 hours, and preferably at a temperature ranging from room temperature to about the boiling point of the solvent for a period of about 1 to about 10 hours.

In the silica polycondensate (B), no particular limitation is placed on the proportions of colloidal silica and the silane compound of the general formula (I). However, the silane compound is preferably used in an amount of 0.1 to 2,000 parts by weight, more preferably 1 to 1,000 parts by weight, per 100 parts by weight of the colloidal silica solid component.

Where the silane compound comprises at least one compound of the general formula (II), the silane compound is preferably used in an amount of 5 to 2,000 parts by weight, more preferably 10 to 1,000 parts by weight, per 100 parts by weight of the colloidal silica solid component.

Where the silane compound comprises at least one compound of the general formula (III), the silane compound is preferably used in an amount of 1 to 2,000 parts by weight, more preferably 5 to 1,000 parts by weight, per 100 parts by weight of the colloidal silica solid component.

Where the silane compound comprises a combination of at least one compound of the general formula (II) and at least one compound of the general formula (III), the compound of the general formula (II) is preferably used in an amount of 5 to 2,000 parts by weight, more preferably 10 to 1,000 parts by weight, per 100 parts by weight of the colloidal silica solid component, and the compound of the general formula (III) is preferably used in an amount of 0.1 to 2,000 parts by weight, more preferably 1 to 1,000 parts by weight, per 100 parts by weight of the colloidal silica solid component.

Where the silane compound comprises at least one compound of any of the general formulas (IV) to (VII), the silane compound is preferably used in an amount of 1 to 2,000 parts by weight, more preferably 5 to 1,000 parts by weight, per 100 parts by weight of the colloidal silica solid component.

Where the silane compound comprises a combination of at least one compound of the general formula (II) and at least one compound of any of the general formulas (IV) to (VII), the compound of the general formula (II) is preferably used in an amount of 5 to 2,000 parts by weight, more preferably 10 to 1,000 parts by weight, per 100 parts by weight of the colloidal silica solid component, and the compound of any of the general formulas (IV) to (VII) is preferably used in an amount of 0.1 to 2,000 parts by weight, more preferably 1 to 1,000 parts by weight, per 100 parts by weight of the colloidal silica solid component.

The composite compositions of the present invention contain a silica polycondensate (B) formed by hydrolysis and polycondensation of a silane compound in a dispersion system of colloidal silica, and a polymer of a radical-polymerizable vinyl compound (A). The proportions of the radical-polymerizable vinyl compound (A) and the silica polycondensate (B) are preferably chosen so that the components (A) and (B) are present in amounts of 1 to 99% by weight and 99 to 1% by weight, respectively. More preferably, the components (A) and (B) are used in amounts of 10 to 90% by weight and 90 to 10% by weight, respectively. Most preferably, the components (A) and (B) are used in amounts of 20 to 80% by weight and 80 to 20% by weight, respectively. When the silica polycondensate (B) is used in an amount of 80 to 20% by weight, the properties desired in the present invention are manifested to a full degree.

The composite compositions of the present invention are preferably produced by mixing the radical-polymerizable vinyl compound (A) and the silica polycondensate (B) in a desired state and polymerizing them concurrently. Alternatively, they may be produced by partially polymerizing the radical-polymerizable vinyl compound (A) in advance, mixing this partial polymer of the radical-polymerizable vinyl compound (A) and the silica polycondensate, and polymerizing them.

Even when the SiO$_2$ content is 15% by weight or greater, the composite compositions of the present invention have a haze of not greater than 5% as measured at a plate thickness of 3 mm. Electron micrographs reveals that colloidal silica particles are very uniformly dispersed without suffering agglomeration. This means that, in the composite compositions of the present invention, colloidal silica particles are incorporated in the silica skeleton formed by hydrolysis and polycondensation of at least one silane compound and intermingled with the polymer of the radical-polymerizable vinyl compound (A) on a molecular level, thus permitting the achievement of high transparency. In the case of acrylic resins having fine silica particles simply dispersed therein, their haze as measured at a plate thickness of 3 mm is greater than 20% at SiO$_2$ contents of 15% by weight or greater, thus showing a marked reduction in transparency.

Although no particular limitation is placed on the method by which the composite compositions of the present invention are produced, it is preferable to produce them according to the conventionally known cast polymerization process. By way of example, the cast polymerization process starts with mixing the radical-polymerizable vinyl compound (A) in the form of a monomer or a partial polymer with the silica polycondensate (B). The solvent and water remaining in this mixture are distilled off to obtain a mixed solution comprising the component (B) dissolved in the component (A). Then, a casting material is prepared by adding a radical polymerization initiator to the mixed solution. More specifically, the mixing of both components is carried out, for example, by mixing the component (A) directly with a solution of the silica polycondensate (B) in a suitable solvent and then removing the solvent and water associated with the component (B), or by adding the component (A) to a solution of the silica polycondensate (B) while removing therefrom the solvent and water associated with the component (B). Thus, it is important to prepare a mixed solution of both components without causing the component (B) to separate out as a solid. It is to be understood that the above-described mixed solution can have any viscosity, so long as the component (B) is homogeneously dissolved in the component (A). For example, the mixed solution may have the form of a gel-like material.

The radical polymerization initiators which can be used for this purpose include, for example, azo compounds such as 2,2'-azobisisobutyronitrile, 2,2'-azobis(2,4-dimethylvaleronitrile) and 2,2'-azobis(2,4-dimethyl-4-methoxyvaleronitrile); organic peroxides such as benzoyl peroxide and lauroyl peroxide; and redox polymerization initiators.

This casting material can be cast-polymerized by the cell casting process in which a cell is formed by two surface-treated inorganic glass or metal plates disposed in opposed relationship and sealed with a gasket at their periphery, and the casting material is poured into the cell and heated; or the continuous casting process in which a casting space is defined by two stainless steel endless belts having one mirror-polished surface and traveling in the same direction at the same speed, and two gaskets disposed along the edges of the belts, and the above-described casting material is continuously poured into the casting space from the upstream side and heated. The polymerization temperature at which the composite compositions of the present invention are produced is usually within the range of 10 to 150° C. However, it is preferable to form a composite composition by electing polymerization of the radical-polymerizable vinyl compound (A) and further polycondensation of the silica polycondensate (B) concurrently at a temperature above room temperature, i.e., within the range of 40° to 150° C.

Furthermore, in any convenient step of the present process, various additives such as colorants, ultraviolet absorbers, thermal stabilizers and mold releasing agents may be incorporated in the composite composition in such amounts as not to impair the effects of the present invention.

The present invention is more specifically explained with reference to the following examples. However, it is to be understood that the present invention is not limited thereto. In these examples, all parts are by weight unless otherwise stated.

Transparency was evaluated by using an integrating sphere type haze meter (SEP-H-SS; manufactured by Japan Precision Optics Co., Ltd.) to measure the total light transmittance and haze of a sample according to ASTM D1003. Thermal resistance was evaluated by annealing a sample and then measuring its heat distortion temperature (HDT) according to ASTM D648. Strength was evaluated by annealing a sample at 130° C. for 60 hours and then making a bending test of the sample according to ASTM D790 to determine its flexural breaking strength and flexural modulus of elasticity.

EXAMPLE 1

A glass flask fitted with agitating blades was charged with 98.8 parts of tetraethoxysilane (hereinafter abbreviated as TES) and 100 parts of colloidal silica dispersed in isopropyl alcohol so as to have a silica content of 30% by weight (commercially available from Catalyst Chemical Industry Co., Ltd. under the trade name of OSCAL-1432; hereinafter abbreviated as S-1). While the contents of the flask were being stirred, 18 parts of deionized water and 0.5 part of 36 wt. % hydrochloric acid were added thereto and the temperature was raised to 70° C. After 2 hours, the volatile components were distilled off at 40° C. under reduced pressure by means of a rotary evaporator, while methyl methacrylate (hereinafter abbreviated as MMA) was added at the same rate as the volatile components were distilled off. Finally, the solvent was completely replaced by MMA and the resulting mixture was concentrated to a total amount of 150 parts (a solid content (i.e., silica polycondensate (B) content) of about 40% by weight).

Then, 0.15 part of 2,2'-azobisisobutyronitrile (hereinafter abbreviated as AIBN) as a polymerization initiator was added to and dissolved in 150 parts of the above mixed solution. After the mixed solution was exposed to reduced pressure in order to remove any dissolved air, it was poured into a cell formed by a gasket and two stainless steel plates and adjusted previously so as to have a thickness of 3 mm. Subsequently, the mixed solution was polymerized at 80° C. for 2 hours and then at 130° C. for 2 hours to obtain a cast plate. Properties of this cast plate were evaluated and the results thus obtained are shown in Table 1.

EXAMPLE 2

A glass flask fitted with agitating blades was charged with 98.8 parts of TES, 4.5 parts of methyltriethoxysilane (hereinafter abbreviated as MTES), 100 parts of colloidal silica S-1 and 80 parts of ethanol. While the contents of the flask were being stirred, 18 parts of deionized water and 0.5 part of 36 wt. % hydrochloric acid were added thereto and the temperature was raised to 70° C. After 2 hours, the volatile components were distilled off at 40° C. under reduced pressure by means of a rotary evaporator, while MMA was added at the same rate as the volatile components were distilled off. Finally, the solvent was completely replaced by MMA and the resulting mixed solution was concentrated to a total amount of 150 parts (a solid content of about 40% by weight).

Then, 0.15 part of AIBN was added to 150 parts of the above mixed solution. Thereafter, the mixed solution was polymerized in exactly the same manner as described in Example 1 to obtain a cast plate. Properties of this cast plate were evaluated and the results thus obtained are shown in Table 1.

EXAMPLE 3

A glass flask fitted with agitating blades was charged with 98.8 parts of TES, 4.5 parts of MTES and 100 parts of colloidal silica dispersed in methyl alcohol so as to have a silica content of 30% by weight (commercially available from Catalyst Chemical Industry Co., Ltd. under the trade name of OSCAL-1132; hereinafter abbreviated as S-2). While the contents of the flask were being stirred, 36 parts of deionized water and 0.5 part of 36 wt. % hydrochloric acid were added thereto and the resulting mixture was heated under reflux. After 2 hours, the mixture was cooled and 100 parts of 2-hydroxyethyl methacrylate (hereinafter abbreviated as HEMA) was added thereto. Then, the volatile components were distilled off at 40° C. under reduced pressure by means of a rotary evaporator and, furthermore, completely distilled off by means of a vacuum pump. Thus, there was obtained 170 parts of a mixed solution (a solid content of about 36% by weight).

Then, 0.15 part of AIBN was added to 150 parts of the above mixed solution. Thereafter, the mixed solution was polymerized in exactly the same manner as described in Example 1 to obtain a cast plate. Properties of this cast plate were evaluated and the results thus obtained are shown in Table 1.

EXAMPLE 4

A glass flask fitted with agitating blades was charged with 22.3 parts of MTES and 200 parts of colloidal silica S-1. While the contents of the flask were being stirred, 14 parts of deionized water and 0.5 part of 36 wt. % hydrochloric acid were added thereto and the temperature was raised to 70° C. After 2 hours, 10 parts of HEMA was added thereto. Then, the volatile components were distilled off at 40° C. under reduced pressure by means of a rotary evaporator, while MMA was added at the same rate as the volatile components were distilled off. Finally, the solvent was completely replaced by MMA and the resulting mixed solution was concentrated to a total amount of 135 parts (a solid content of about 50% by weight).

Then, 0.13 part of AIBN was added to 135 parts of the above mixed solution. Thereafter, the mixed solution was polymerized in exactly the same manner as described in Example 1 to obtain a cast plate. Properties of this cast plate were evaluated and the results thus obtained are shown in Table 1.

EXAMPLE 5

A glass flask fitted with agitating blades was charged with 98.8 parts of TES, 4.5 parts of MTES and 100 parts of colloidal silica S-1. While the contents of the flask were being stirred, 18 parts of deionized water and 0.5 part of 36 wt. % hydrochloric acid were added thereto and the temperature was raised to 70° C. After 2 hours, the mixture was cooled to 0° C. and added slowly to a stirred solution which had been prepared by dissolving 5.0 parts of titanium tetraisopropoxide (hereinafter abbreviated as TTIP) in 50 parts of isopropyl alcohol and had previously been cooled to 0° C. Thereafter, the volatile components were distilled off at 40° C. under reduced pressure by means of a rotary evaporator, while MMA was added at the same rate as the volatile components were distilled off. Finally, the solvent was completely replaced by MMA and the resulting mixed solution was concentrated to a total amount of 150 parts (a solid content of about 40% by weight).

Then, 0.15 part of AIBN was added to 150 parts of the above mixed solution. Thereafter, the mixed solution was polymerized in exactly the same manner as described in Example 1 to obtain a cast plate. Properties of this cast plate were evaluated and the results thus obtained are shown in Table 1.

EXAMPLE 6

A glass flask fitted with agitating blades was charged with 22.3 parts of MTES and 300 parts of colloidal silica dispersed in water so as to have a silica content of 20% by weight (commercially available from Nissan Chemical Industries, Ltd. under the trade name of Snowtex-0; hereinafter abbreviated as S-3). While the contents of the flask were being stirred, 0.5 part of 36 wt. % hydrochloric acid was added thereto and the resulting mixevaluated and the results thus obtained are shown in Table 1.

Comparative Example 1

0.15 part of AIBN was dissolved in 150 parts of MMA. This mixture was polymerized in the same manner as described in Example 1 to obtain a cast plate. Properties of this cast plate were evaluated and the results thus obtained are shown in Table 1.

Comparative Example 2

An attempt was made to prepare a solution having a solid content of 30% by weight from colloidal silica and MMA. Specifically, the volatile components were distilled off from 100 parts of colloidal silica S-1 at 40° C. under reduced pressure by means of a rotary evaporator, while MMA was added at the same rate as the volatile components were distilled off. However, before the solvent was completely replaced by MMA, the solution showed an abrupt increase in viscosity and formed a gel, which made it impossible to subject the solution to the polymerization procedure.

TABLE 1

| Example No. | Radical-polymerizable vinyl compound | Colloidal silica Type | Colloidal silica Amount (parts) | Silane compound Type | Silane compound Amount (parts) | Solid content (wt. %) | Total light transmittance (%) | Haze (%) | HDT (°C.) | Flexural breaking strength (kg/cm$^2$) | Flexural modulus of elasticity (kg/cm$^2$) |
|---|---|---|---|---|---|---|---|---|---|---|---|
| Example 1 | MMA | S-1 | 100 | TES | 98.8 | 40 | 93.6 | 2.7 | 185 | 1,200 | 4.8 × 10$^4$ |
| Example 2 | MMA | S-1 | 100 | TES | 98.8 | 40 | 93.3 | 2.6 | 164 | 1,230 | 4.5 × 10$^4$ |
|  |  |  |  | MTES | 4.5 |  |  |  |  |  |  |
| Example 3 | HEMA | S-2 | 100 | TES | 98.8 | 36 | 92.6 | 3.6 | 159 | 1,240 | 6.2 × 10$^4$ |
|  |  |  |  | MTES | 4.5 |  |  |  |  |  |  |
| Example 4 | MMA HEMA | S-1 | 200 | MTES | 22.3 | 50 | 92.5 | 2.9 | 148 | 1,200 | 5.7 × 10$^4$ |
| Example 5 | MMA | S-1 | 100 | TES | 98.8 | 40 | 92.2 | 3.8 | 160 | 1,200 | 5.8 × 10$^4$ |
|  |  |  |  | MTES | 4.5 |  |  |  |  |  |  |
|  |  |  |  | TTIP | 5.0 |  |  |  |  |  |  |
| Example 6 | HEMA | S-3 | 300 | MTES | 22.3 | 40 | 92.4 | 3.6 | 145 | 1,200 | 5.2 × 10$^4$ |
| Example 7 | MMA | S-1 | 150 | TES | 36.0 | 38 | 93.3 | 2.5 | 166 | 1,230 | 5.5 × 10$^4$ |
|  |  |  |  | MTES | 3.5 |  |  |  |  |  |  |
| Example 8 | MMA | S-1 | 200 | TES | 49.1 | 50 | 92.3 | 2.6 | 202 | 1,200 | 7.3 × 10$^4$ |
|  |  |  |  | MTES | 4.7 |  |  |  |  |  |  |
| Example 9 | MMA | S-1 | 100 | TES | 98.8 | 20 | 93.6 | 1.7 | 150 | 1,200 | 4.1 × 10$^4$ |
| Comparative Example 1 | MMA | — | — | — | — | — | 92.1 | 1.3 | 100 | 1,200 | 3.5 × 10$^4$ | ture was heated to 70° C. After 2 hours, the mixture was cooled and 100 parts of HEMA was added thereto. After 100 parts of ethyl cellosolve was added in order to form an azeotropic mixture with water, the volatile components were distilled off at 40° C. under reduced pressure by means of a rotary evaporator and, furthermore, completely distilled off by means of a vacuum pump. Thus, there was obtained 170 parts of a mixed solution (a solid content of about 40% by weight).

Then, 0.15 part of AIBN was added to 150 parts of the above mixed solution. Thereafter, the mixed solution was polymerized in exactly the same manner as described in Example 1 to obtain a cast plate. Properties of this cast plate were evaluated and the results thus obtained are shown in Table 1.

EXAMPLES 7–9

Cast plates were obtained in exactly the same manner as described in Example 1, except that the types and amounts of radical-polymerizable vinyl compound, colloidal silica and silane compound used were altered as shown in Table 1. Properties of these cast plates were

Synthesis Example

While 208 parts of HEMA was being stirred at room temperature, 68 parts of tetrachlorosilane was added dropwise thereto over a period of 4 hours. After completion of the addition, the stirring was continued for 0.5 hour and the temperature was then raised to 50° C. After an hour, the volatile components were completely removed by means of a rotary evaporator to obtain tetrakis(methacryloyloxyethoxy)-silane (hereinafter abbreviated as TMES).

Moreover, tetrakis(acryloyloxyethoxy)silane (hereinafter abbreviated as TAES) was obtained in the same manner as described above, except that 208 parts of HEMA was replaced by 186 parts of 2-hydroxyethyl acrylate.

EXAMPLE 10

A glass flask fitted with agitating blades was charged with 32.6 parts of the TMES prepared in Synthesis Example and 240 parts of colloidal silica S-1. While the contents of the flask were being stirred, 8.6 parts of deionized water and 0.1 part of 36 wt. % hydrochloric acid were added thereto and the temperature was raised to 70° C. After 2 hours, the volatile components were distilled off at 40° C. under reduced pressure by means of a rotary evaporator, while MMA was added at the same rate as the volatile components were distilled off. Finally, the solvent was completely replaced by MMA and the resulting mixed solution was concentrated to a total amount of 150 parts (a solid content of about 50% by weight).

Then, 0.15 part of AIBN was added to and dissolved in 150 parts of the above mixed solution. After the mixed solution was exposed to reduced pressure in order to remove any dissolved air, it was poured into a cell formed by a gasket and two stainless steel plates and adjusted previously so as to have a thickness of 3 mm. Subsequently, the mixed solution was polymerized at 80° C. for 2 hours and then at 130° C. for 2 hours to obtain a cast plate. Properties of this cast plate were evaluated and the results thus obtained are shown in Table 2.

EXAMPLE 11

A glass flask fitted with agitating blades was charged with 32.6 parts of TMES and 240 parts of colloidal silica S-1. While the contents of the flask were being stirred, 4.3 parts of deionized water and 0.1 part of 36 wt. % hydrochloric acid were added thereto and the temperature was raised to 70° C. After 2 hours, the mixture was cooled and 75 parts of HEMA was added thereto. Then, the volatile components were distilled off at 40° C. under reduced pressure by means of a rotary evaporator and, furthermore, completely distilled off by means of a vacuum pump. Thus, there was obtained 150 parts of a mixed solution (a solid content of about 50% by weight).

Then, 0.15 part of AIBN was added to 150 parts of the above mixed solution. Thereafter, the mixed solution was polymerized in exactly the same manner as described in Example 10 to obtain a cast plate. Properties of this cast plate were evaluated and the results thus obtained are shown in Table 2.

EXAMPLE 12

A glass flask fitted with agitating blades was charged with 32.6 parts of TMES and 240 parts of colloidal silica S-2. While the contents of the flask were being stirred, 4.3 parts of deionized water and 0.1 part of 36 wt. % hydrochloric acid were added thereto and the resulting mixture was heated under reflux. After 2 hours, the volatile components were distilled off at 40° C. under reduced pressure by means of a rotary evaporator, while MMA was added at the same rate as the volatile components were distilled off. Finally, the solvent was completely replaced by MMA and the resulting mixed solution was concentrated to a total amount of 150 parts (a solid content of about 50% by weight).

Then, 0.15 part of AIBN was added to 150 parts of the above mixed solution. Thereafter, the mixed solution was polymerized in exactly the same manner as described in Example 10 to obtain a cast plate. Properties of this cast plate were evaluated and the results thus obtained are shown in Table 2.

EXAMPLE 13

A glass flask fitted with agitating blades was charged with 27.2 parts of TMES and 300 parts of colloidal silica S-3. While the contents of the flask were being stirred, 0.5 part of 36 wt. % hydrochloric acid was added thereto and the resulting mixture was heated to 70° C. After 2 hours, the mixture was cooled and 95 parts of HEMA was added thereto. After 100 parts of ethyl cellosolve was added in order to form an azeotropic mixture with water, the volatile components were distilled off at 40° C under reduced pressure by means of a rotary evaporator and, furthermore, completely distilled off by means of a vacuum pump. Thus, there was obtained 157 parts of a mixed solution (a solid content of about 40% by weight).

Then, 0.15 part of AIBN was added to 150 parts of the above mixed solution. Thereafter, the mixed solution was polymerized in exactly the same manner as described in Example 10 to obtain a cast plate. Properties of this cast plate were evaluated and the results thus obtained are shown in Table 2.

EXAMPLES 14–16

Cast plates were obtained in exactly the same manner as described in Example 10, except that the types and amounts of radical-polymerizable vinyl compound, colloidal silica and silane compound used and the solid content of the mixed solution were altered as shown in Table 2. Properties of these cast plates were evaluated and the results thus obtained are shown in Table 2.

TABLE 2

| Example No. | Radical-polymerizable vinyl compound | Colloidal silica Type | Colloidal silica Amount (parts) | Silane compound Type | Silane compound Amount (parts) | Solid content (wt. %) | Total light transmittance (%) | Haze (%) | HDT (°C.) | Flexural breaking strength (kg/cm²) | Flexural modulus of elasticity (kg/cm²) |
|---|---|---|---|---|---|---|---|---|---|---|---|
| Example 10 | MMA | S-1 | 240 | TMES | 32.6 | 50 | 93.2 | 1.6 | 151 | 1,250 | $7.7 \times 10^4$ |
| Example 11 | HEMA | S-1 | 240 | TMES | 32.6 | 50 | 93.3 | 2.5 | 146 | 1,250 | $7.6 \times 10^4$ |
| Example 12 | MHA | S-2 | 240 | TMES | 32.6 | 50 | 92.9 | 1.7 | 152 | 1,200 | $7.6 \times 10^4$ |
| Example 13 | HEMA | S-3 | 300 | TMES | 27.2 | 40 | 92.6 | 2.7 | 144 | 1,200 | $6.8 \times 10^4$ |
| Example 14 | MRA | S-1 | 240 | TAES | 29.3 | 50 | 93.2 | 1.6 | 143 | 1,250 | $6.3 \times 10^4$ |
| Example 15 | MMA | S-1 | 100 | TMES | 13.0 | 20 | 93.0 | 1.6 | 135 | 1,230 | $5.0 \times 10^4$ |
| Example 16 | MMA | S-1 | 240 | TMES | 65.2 | 40 | 93.1 | 1.5 | 149 | 1,250 | $6.5 \times 10^4$ |

EXAMPLE 17

A glass flask fitted with agitating blades was charged with 41.6 parts of TES, 27.2 parts of TMES and 200 parts of colloidal silica S-1. While the contents of the flask were being stirred, 9 parts of deionized water and 0.2 part of 36 wt. % hydrochloric acid were added thereto and the temperature was raised to 70° C.

After 2 hours, the volatile components were distilled off at 40° C. under reduced pressure by means of a rotary evaporator, while MMA was added at the same rate as the volatile components were distilled off. Finally, the solvent was completely replaced by MMA and the resulting mixed solution was concentrated to a total amount of 150 parts (a solid content of about 50% by weight).

Then, 0.15 part of AIBN was added to and dissolved in 150 parts of the above mixed solution. After the mixed solution was exposed to reduced pressure in order to remove any dissolved air, it was poured into a cell formed by a gasket and two stainless steel plates and adjusted previously so as to have a thickness of 3 mm. Subsequently, the mixed solution was polymerized at 80° C. for 5 hours and then at 130° C. for 2 hours to obtain a cast plate. Properties of this cast plate were evaluated and the results thus obtained are shown in Table 3.

EXAMPLE 18

A glass flask fitted with agitating blades was charged with 41.6 parts of TES, 27.2 parts of TMES and 200 parts of colloidal silica S-2. While the contents of the flask were being stirred, 36 parts of deionized water and 0.5 part of 36 wt. % hydrochloric acid were added thereto and the resulting mixture was heated under reflux.

After 2 hours, the mixture was cooled and 75 parts of HEMA was added thereto. Then, the volatile components were distilled off at 40° C under reduced pressure by means of a rotary evaporator and, furthermore, completely distilled off by means of a vacuum pump. Thus, there was obtained 150 parts of a mixed solution (a solid content of about 50% by weight).

Then, 0.15 part of AIBN was added to 150 parts of the above mixed solution. Thereafter, the mixed solution was polymerized in exactly the same manner as described in Example 17 to obtain a cast plate. Properties of this cast plate were evaluated and the results thus obtained are shown in Table 3.

EXAMPLE 19

A glass flask fitted with agitating blades was charged with 26.7 parts of MTES, 27.2 parts of TMES and 200 parts of colloidal silica S-1. While the contents of the flask were being stirred, 14 parts of deionized water and 0.5 part of 36 wt. % hydrochloric acid were added thereto and the temperature was raised to 70° C.

After 2 hours, the volatile components were distilled of at 40° C. under reduced pressure by means of a rotary evaporator, while MMA was added at the same rate as the volatile components were distilled off. Finally, the solvent was completely replaced by MMA and the resulting mixed solution was concentrated to a total amount of 144 parts (a solid content of about 50% by weight).

Then, 0.13 part of AIBN was added to 135 parts of the above mixed solution. Thereafter, the mixed solution was polymerized in exactly the same manner as described in Example 17 to obtain a cast plate. Properties of this cast plate were evaluated and the results thus obtained are shown in Table 3.

EXAMPLE 20

A glass flask fitted with agitating blades was charged with 41.6 parts of TES, 27.2 parts of TMES and 200 parts of colloidal silica S-1. While the contents of the flask were being stirred, 18 parts of deionized water and 0.5 part of 36 wt. % hydrochloric acid were added thereto and the temperature was raised to 70° C.

After 2 hours, the mixture was cooled to 0° C. and added slowly to a stirred solution which had been prepared by dissolving 5.0 parts of TTIP in 50 parts of isopropyl alcohol and had previously been cooled to 0° C. Thereafter, the volatile components were distilled off at 40° C. under reduced pressure by means of a rotary evaporator, while MMA was added at the same rate as the volatile components were distilled off. Finally, the solvent was completely replaced by MMA and the resulting mixed solution was concentrated to a total amount of 190 parts (a solid content of about 40% by weight).

Then, 0.15 part of AIBN was added to 150 parts of the above mixed solution. Thereafter, the mixed solution was polymerized in exactly the same manner as described in Example 17 to obtain a cast plate. Properties of this cast plate were evaluated and the results thus obtained are shown in Table 3.

EXAMPLE 21

A glass flask fitted with agitating blades was charged with 26.7 parts of MTES, 27.2 parts of TMES and 300 parts of colloidal silica S-3. While the contents of the flask were being stirred, 0.5 part of 36 wt. % hydrochloric acid was added thereto and the resulting mixture was heated to 70° C.

After 2 hours, the mixture was cooled and 100 parts of HEMA was added thereto. After 100 parts of ethyl cellosolve was added in order to form an azeotropic mixture with water, the volatile components were distilled off at 40° C. under reduced pressure by means of a rotary evaporator and, furthermore, completely distilled off by means of a vacuum pump. Thus, there was obtained 180 parts of a mixed solution (a solid content of about 40% by weight).

Then, 0.15 part of AIBN was added to 150 parts of the above mixed solution. Thereafter, the mixed solution was polymerized in exactly the same manner as described in Example 17 to obtain a cast plate. Properties of this cast plate were evaluated and the results thus obtained are shown in Table 3.

EXAMPLE 22-24

Cast plates were obtained in exactly the same manner as described in Example 17, except that the types and amounts of radical-polymerizable vinyl compound, colloidal silica and silane compound used were altered as shown in Table 3. Properties of these cast plates were evaluated and the results thus obtained are shown in Table 3.

TABLE 3

| Example No. | Radical-polymerizable vinyl compound | Colloidal silica Type | Colloidal silica Amount (parts) | Silane compound Type | Silane compound Amount (parts) | Solid content (wt. %) | Total light transmittance (%) | Haze (%) | HDT (°C.) | Flexural breaking strength (kg/cm$^2$) | Flexural modulus of elasticity (kg/cm$^2$) |
|---|---|---|---|---|---|---|---|---|---|---|---|
| Example 17 | MRA | S-1 | 200 | TES<br>TMES | 41.6<br>27.2 | 50 | 92.8 | 2.7 | 153 | 1,210 | 7.3 × 10$^4$ |
| Example 18 | HEMA | S-2 | 200 | TES<br>TMES | 41.6<br>27.2 | 50 | 92.6 | 2.8 | 156 | 1,220 | 7.2 × 10$^4$ |

TABLE 3-continued

| Example No. | Radical-polymerizable vinyl compound | Colloidal silica Type | Colloidal silica Amount (parts) | Silane compound Type | Silane compound Amount (parts) | Solid content (wt. %) | Total light transmittance (%) | Haze (%) | HDT (°C.) | Flexural breaking strength (kg/cm$^2$) | Flexural modulus of elasticity (kg/cm$^2$) |
|---|---|---|---|---|---|---|---|---|---|---|---|
| Example 19 | MMA | S-1 | 200 | MTES<br>TMES | 26.7<br>27.2 | 50 | 92.5 | 2.8 | 142 | 1,200 | 6.6 × 10$^4$ |
| Example 20 | MMA | S-1 | 200 | TES<br>TMES<br>TTIP | 41.6<br>27.2<br>5.0 | 40 | 91.8 | 2.9 | 155 | 1,210 | 6.7 × 10$^4$ |
| Example 21 | HEMA | S-3 | 300 | MTES<br>TMES | 26.7<br>27.2 | 40 | 92.6 | 3.2 | 141 | 1,200 | 6.4 × 10$^4$ |
| Example 22 | MMA | S-1 | 200 | TES<br>TAES | 41.6<br>24.4 | 50 | 92.6 | 2.6 | 136 | 1,250 | 5.9 × 10$^4$ |
| Example 23 | MMA | S-1 | 100 | TES<br>TMES | 20.8<br>18.6 | 20 | 93.0 | 1.7 | 134 | 1,230 | 5.1 × 10$^4$ |
| Example 24 | MMA | S-1 | 240 | TES<br>TMES | 10.4<br>27.2 | 55 | 92.8 | 2.6 | 176 | 1,210 | 7.9 × 10$^4$ |

EXAMPLE 25

A glass flask fitted with agitating blades was charged with 29.8 parts of γ-methacryloyloxypropyltrimethoxysilane (hereinafter abbreviated as MPTMS) and 240 parts of colloidal silica S-1. While the contents of the flask were being stirred, 6.5 parts of deionized water and 0.1 part of 36 wt. % hydrochloric acid were added thereto and the temperature was raised to 70° C. After 2 hours, the volatile components were distilled off at 40° C. under reduced pressure by means of a rotary evaporator, while MMA was added at the same rate as the volatile components were distilled off. Finally, the solvent was completely replaced by MMA and the resulting mixed solution was concentrated to a total amount of 158 parts (a solid content of about 50% by weight).

Then, 0.15 part of AIBN was added to and dissolved in 150 parts of the above mixed solution. After the mixed solution was exposed to reduced pressure in order to remove any dissolved air, it was poured into a cell formed by a gasket and two stainless steel plates and adjusted previously so as to have a thickness of 3 mm. Subsequently, the mixed solution was polymerized at 80° C. for 2 hours and then at 130° C. for 2 hours to obtain a cast plate. Properties of this cast plate were evaluated and the results thus obtained are shown in Table 4.

EXAMPLE 26

A glass flask fitted with agitating blades was charged with 17.8 parts of vinyltrimethoxysilane (hereinafter abbreviated as VTMS) and 240 parts of colloidal silica S-1. While the contents of the flask were being stirred, 6.5 parts of deionized water and 0.1 part of 36 wt. % hydrochloric acid were added thereto and the resulting mixture was heated to 70° C. After 2 hours, the mixture was cooled and 10 parts of HEMA was added thereto. Then, the volatile components were distilled off at 40° C. under reduced pressure by means of a rotary evaporator, while MMA was added at the same rate as the volatile components were distilled off. Finally, the solvent was completely replaced by MMA and the resulting mixed solution was concentrated to a total amount of 158 parts (a solid content of about 50% by weight).

Then, 0.15 part of AIBN was added to 150 parts of the above mixed solution. Thereafter, the mixed solution was polymerized in exactly the same manner as described in Example 25 to obtain a cast plate. Properties of this cast plate were evaluated and the results thus obtained are shown in Table 4.

EXAMPLE 27

A glass flask fitted with agitating blades was charged with 29.8 parts of MPTMS and 240 parts of colloidal silica S-2. While the contents of the flask were being stirred, 6.5 parts of deionized water and 0.1 part of 36 wt. % hydrochloric acid were added thereto and the temperature was raised to 70° C. After 2 hours, the mixture was cooled and 75 parts of HEMA was added thereto. Then, the volatile components were distilled off at 40° C. under reduced pressure by means of a rotary evaporator and, furthermore, completely distilled off by means of a vacuum pump. Thus, there was obtained 158 parts of a mixed solution (a solid content of about 40% by weight).

Then, 0.15 part of AIBN was added to 150 parts of the above mixed solution. Thereafter, the mixed solution was polymerized in exactly the same manner as described in Example 25 to obtain a cast plate. Properties of this cast plate were evaluated and the results thus obtained are shown in Table 4.

EXAMPLES 28–32

Cast plates were obtained in exactly the same manner as described in Example 25, except that the types and amounts of radical-polymerizable vinyl compound, colloidal silica and silane compound used and the solid content of the mixed solution were altered as shown in Table 4. Properties of these cast plates were evaluated and the results thus obtained are shown in Table 4.

TABLE 4

| Example No. | Radical-polymerizable vinyl compound | Colloidal silica Type | Colloidal silica Amount (parts) | Silane compound Type | Silane compound Amount (parts) | Solid content (wt. %) | Total light transmittance (%) | Haze (%) | HDT (°C.) | Flexural breaking strength (kg/cm$^2$) | Flexural modulus of elasticity (kg/cm$^2$) |
|---|---|---|---|---|---|---|---|---|---|---|---|
| Example 25 | MMA | S-1 | 240 | MPTMS | 29.8 | 50 | 93.5 | 2.6 | 192 | 1,220 | 8.7 × 10$^4$ |
| Example 26 | MMA<br>HEMA | S-1 | 240 | VTMS | 17.8 | 50 | 93.4 | 2.5 | 186 | 1,220 | 8.6 × 10$^4$ |
| Example 27 | HEMA | S-2 | 240 | MPTMS | 29.8 | 50 | 93.1 | 2.7 | 185 | 1,200 | 8.4 × 10$^4$ |

TABLE 4-continued

| Example No. | Radical-polymerizable vinyl compound | Colloidal silica Type | Colloidal silica Amount (parts) | Silane compound Type | Silane compound Amount (parts) | Solid content (wt. %) | Total light transmittance (%) | Haze (%) | HDT (°C.) | Flexural breaking strength (kg/cm$^2$) | Flexural modulus of elasticity (kg/cm$^2$) |
|---|---|---|---|---|---|---|---|---|---|---|---|
| Example 28 | MMA | S-1 | 240 | MCTMS | 23.6 | 50 | 93.0 | 2.7 | 190 | 1,200 | 8.3 × 10$^4$ |
| Example 29 | MMA | S-1 | 240 | MPDMS | 27.8 | 50 | 93.1 | 2.7 | 167 | 1,250 | 7.8 × 10$^4$ |
| Example 30 | MMA | S-1 | 100 | VTMS | 3.5 | 20 | 93.4 | 1.8 | 165 | 1,250 | 5.0 × 10$^4$ |
| Example 31 | MMA | S-1 | 240 | VTMS | 35.5 | 40 | 93.5 | 2.5 | 178 | 1,250 | 6.9 × 10$^4$ |
| Example 32 | MMA | S-1 | 240 | VPDMS | 26.4 | 40 | 93.0 | 2.5 | 162 | 1,200 | 6.5 × 10$^4$ |

The abbreviations used in Table 4 are as follows:
MCTMS: γ-mercaptopropyltrimethoxysilane
MPDMS: γ-Methacryloyloxypropyldimethoxymethylsilane VPDMS: p-Vinylphenylmethyldimethoxysilane

EXAMPLE 33

A glass flask fitted with agitating blades was charged with 98.8 parts of TES, 6.2 parts of MPTMS, 100 parts of colloidal silica S-1 and 80 parts of ethanol. While the contents of the flask were being stirred, 18 parts of deionized water and 0.5 part of 36 wt. % hydrochloric acid were added thereto and the temperature was raised to 70° C.

After 2 hours, the volatile components were distilled off at 40° C under reduced pressure by means of a rotary evaporator, while MMA was added at the same rate as the volatile components were distilled off. Finally, the solvent was completely replaced by MMA and the resulting mixed solution was concentrated to a total amount of 150 parts (a solid content of about 40% by weight).

Then, 0.15 part of AIBN was added to and dissolved in 150 parts of the above mixed solution. After the mixed solution was exposed to reduced pressure in order to remove any dissolved air, it was poured into a cell formed by a gasket and two stainless steel plates and adjusted previously so as to have a thickness of 3 mm. Subsequently, the mixed solution was polymerized at 80° C. for 2 hours and then at 130° C. for 2 hours to obtain a cast plate. Properties of this cast plate were evaluated and the results thus obtained are shown in Table 5.

EXAMPLE 34

A glass flask fitted with agitating blades was charged with 98.8 parts of TES, 6.2 parts of MPTMS and 100 parts of colloidal silica S-2. While the contents of the flask were being stirred, 36 parts of deionized water and 0.5 part of 36 wt. % hydrochloric acid were added thereto and the resulting mixture was heated under reflux.

After 2 hours, the mixture was cooled and 100 parts of HEMA was added thereto. Then, the volatile components were distilled off at 40° C. under reduced pressure by means of a rotary evaporator and, furthermore, completely distilled off by means of a vacuum pump. Thus, there was obtained 170 parts of a mixed solution (a solid content of about 36% by weight).

Then, 0.15 part of AIBN was added to 150 parts of the above mixed solution. Thereafter, the mixed solution was polymerized in exactly the same manner as described in Example 33 to obtain a cast plate. Properties of this cast plate were evaluated and the results thus obtained are shown in Table 5.

EXAMPLE 35

A glass flask fitted with agitating blades was charged with 22.9 parts of TES, 16.3 parts of VTMS and 220 parts of colloidal silica S-1. While the contents of the flask were being stirred, 6 parts of deionized water and 0.1 part of 36 wt. % hydrochloric acid were added thereto and the temperature was raised to 70° C.

After 2 hours, 10 parts of HEMA was added to the mixture. Then, the volatile components were distilled off at 40° C. under reduced pressure by means of a rotary evaporator, while MMA was added at the same rate as the volatile components were distilled off. Finally, the solvent was completely replaced by MMA and the resulting mixed solution was concentrated to a total amount of 160 parts (a solid content of about 50% by weight).

Then, 0.13 part of AIBN was added to 130 parts of the above mixed solution. Thereafter, the mixed solution was polymerized in exactly the same manner as described in Example 33 to obtain a cast plate. Properties of this cast plate were evaluated and the results thus obtained are shown in Table 5.

EXAMPLE 36

A glass flask fitted with agitating blades was charged with 98.8 parts of TES, 6.2 parts of MPTMS and 100 parts of colloidal silica S-1. While the contents of the flask were being stirred, 18 parts of deionized water and 0.5 part of 36 wt. % hydrochloric acid were added thereto-and the temperature was raised to 70° C.

After 2 hours, the mixture was cooled to 0° C. and added slowly to a stirred solution which had been prepared by dissolving 5.0 parts of TTIP in 50 parts of isopropyl alcohol and had previously been cooled to 0° C. Thereafter, the volatile components were distilled off at 40° C. under reduced pressure by means of a rotary evaporator, while MMA was added at the same rate as the volatile components were distilled off. Finally, the solvent was completely replaced by MMA and the resulting mixed solution was concentrated to a total amount of 150 parts (a solid content of about 40% by weight).

Then, 0.15 part of AIBN was added to 150 parts of the above mixed solution. Thereafter, the mixed solution was polymerized in exactly the same manner as described in Example 33 to obtain a cast plate. Properties of this cast plate were evaluated and the results thus obtained are shown in Table 5.

EXAMPLE 37

A glass flask fitted with agitating blades was charged with 22.3 parts of MTES, 6.2 parts of MPTMS and 300 parts of colloidal silica S-3. While the contents of the flask were being stirred, 0.5 part of 36 wt. % hydrochloric acid was added thereto and the resulting mixture was heated to 70° C.

After 2 hours, the mixture was cooled and 100 parts of HEMA was added thereto. After 100 parts of ethyl cellosolve was added in order to form an azeotropic mixture with water, the volatile components were distilled off at 40° C. under reduced pressure by means of a rotary evaporator and, furthermore, completely distilled off by means of a vacuum pump. Thus, there was obtained 172 parts of a mixed solution (a solid content of about 40% by weight).

Then, 0.15 part of AIBN was added to 150 parts of the above mixed solution. Thereafter, the mixed solution was polymerized in exactly the same manner as described in Example 33 to obtain a cast plate. Properties of this cast plate were evaluated and the results thus obtained are shown in Table 5.

EXAMPLES 38–42

Cast plates were obtained in exactly the same manner as described in Example 33, except that the types and amounts of radical-polymerizable vinyl compound, colloidal silica and silane compound used were altered as shown in Table 5. Properties of these cast plates were evaluated and the results thus obtained are shown in Table 5.

where $R^1$ and $R^2$ are hydrocarbon radicals of 1 to 10 carbon atoms optionally having an ether linkage, ester linkage or carbon-to-carbon double bond, $R^3$ is a hydrogen atom or a hydrocarbon radical of 1 to 10 carbon atoms optionally having an ether linkage, ester linkage or carbon-to-carbon double bond, a and b are whole numbers of 0 to 3, and c is equal to $(4-a-b)$ and represents a whole number of 1 to 4, in a dispersion system of colloidal silica, wherein said silica polycondensate (B) is dissolved in said radical polymerizable vinyl compound (A).

2. A composite composition as claimed in claim 1 which consists essentially of 1 to 99% by weight of the radical-polymerizable vinyl compound (A) and 99 to 1% by weight of the silica polycondensate (B).

3. A composite composition as claimed in claim 2 which consists essentially of 10 to 90% by weight of the radical-polymerizable vinyl compound (A) and 90 to 10% by weight of the silica polycondensate (B).

4. A composite composition as claimed in claim 2 which consists essentially of 20 to 80% by weight of the radical-polymerizable vinyl compound (A) and 80 to 20% by weight of the silica polycondensate (B).

5. A composite composition as claimed in claim 1 wherein the silica polycondensate (B) is formed by

TABLE 4

| Example No. | Radical-polymerizable vinyl compound | Colloidal silica Type | Colloidal silica Amount (parts) | Silane compound Type | Silane compound Amount (parts) | Solid content (wt. %) | Total light transmittance (%) | Haze (%) | HDT (°C.) | Flexural breaking strength (kg/cm²) | Flexural modulus of elasticity (kg/cm²) |
|---|---|---|---|---|---|---|---|---|---|---|---|
| Example 33 | MMA | S-1 | 100 | TES<br>MPTMS | 98.8<br>6.2 | 40 | 93.6 | 2.5 | 185 | 1,250 | $4.4 \times 10^4$ |
| Example 34 | HEMA | S-2 | 100 | TES<br>MPTMS | 98.8<br>6.2 | 36 | 93.5 | 3.5 | 182 | 1,220 | $6.0 \times 10^4$ |
| Example 35 | MMA<br>HEMA | S-1 | 220 | MTES<br>VTMS | 22.9<br>16.3 | 50 | 93.4 | 2.6 | 198 | 1,200 | $7.8 \times 10^4$ |
| Example 36 | MMA | S-1 | 100 | TES<br>MPTMS<br>TTIP | 98.8<br>6.2<br>5.0 | 40 | 92.3 | 3.8 | 195 | 1,200 | $5.6 \times 10^4$ |
| Example 37 | HEMA | S-3 | 300 | MTES<br>MPTMS | 22.3<br>6.2 | 40 | 93.5 | 2.7 | 145 | 1,200 | $5.0 \times 10^4$ |
| Example 38 | MMA | S-1 | 150 | TES<br>MPTMS | 36.0<br>4.8 | 38 | 93.5 | 1.8 | 190 | 1,250 | $5.4 \times 10^4$ |
| Example 39 | MMA | S-1 | 200 | TES<br>MPTMS | 49.1<br>6.5 | 50 | 93.3 | 2.6 | 205 | 1,200 | $7.3 \times 10^4$ |
| Example 40 | MMA | S-1 | 100 | TES<br>MPTMS | 98.8<br>6.2 | 20 | 93.6 | 1.7 | 150 | 1,200 | $4.1 \times 10^4$ |
| Example 41 | MMA | S-1 | 200 | TES<br>VPDMS | 49.1<br>5.5 | 40 | 93.0 | 2.7 | 170 | 1,200 | $5.5 \times 10^4$ |
| Example 42 | MMA<br>HEMA | S-1 | 200 | TES<br>MCTMS | 49.1<br>5.1 | 40 | 92.5 | 2.7 | -158 | 1,200 | $5.4 \times 10^4$ |

The abbreviations used in Table 5 are as follows:
VPDMS: p-Vinylphenylmethyldimethoxysilane
MCTMS: γ-mercaptopropyltrimethoxysilane Thus, the present invention provides composite compositions having high transparency, thermal resistance, rigidity and toughness. These composite compositions are useful in various applications where inorganic glass has heretofore been used, such as windowpanes for houses and vehicles.

It is claimed:

1. A composite composition obtained by polymerizing a radical-polymerizable vinyl compound (A) in the presence of (B) a silica polycondensate formed by hydrolysis and polycondensation of at least one silane compound of the formula

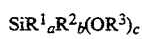

$$SiR^1{}_a R^2{}_b (OR^3)_c$$

using 0.1 to 2,000 parts by weight of the silane compound per 100 parts by weight of the colloidal silica solid component.

6. A composite composition as claimed in claim 5 in which the silica polycondensate (B) is formed by using 1 to 1,000 parts by weight of the silane compound per 100 parts by weight of the colloidal silica solid component.

7. A composite composition as claimed in claim 1 wherein the radical-polymerizable vinyl compound (A) is a methacrylic ester.

8. A composite composition as claimed in claim 1 which has a $SiO_2$ content of not less than 15% by weight and a haze of not greater than 5% as measured at a plate thickness of 3 mm.

9. A composite composition as claimed in claim 1 wherein the silane compound comprises at least one compound of the general formula $$SiR^4{}_a R^5{}_b(OR^6)_c \qquad (II)$$

where $R^4$ and $R^5$ are alkyl radicals of 1 to 10 carbon atoms or phenyl optionally having an ether linkage or ester linkage, $R^6$ is a hydrogen atom or a hydrocarbon radical of 1 to 10 carbon atoms, a and b are whole numbers of 0 to 3, and c is equal to (4−a−b) and represents a whole number of 1 to 4.

10. A composite composition as claimed in claim 1 wherein the silane compound comprises at least one compound of the general formula $$SiR^4{}_n(O-CH_2CH_2-O-CO-(R^7)C=CH_2)_{4-n} \qquad (III)$$

where $R^4$ is a hydrocarbon radical of 1 to 10 carbon atoms optionally having an ether linkage or ester linkage, $R^7$ is a hydrogen atom or a methyl group, and n is a whole number of 0 to 2.

11. A composite composition as claimed in claim 1 wherein the silane compound comprises a mixture composed of at least one compound of the general formula $$SiR^4{}_a R^5{}_b(OR^6)_c \qquad (II)$$

where $R^4$ and $R^5$ are alkyl radicals of 1 to 10 carbon atoms or phenyl optionally having an ether linkage or ester linkage, $R^6$ is a hydrogen atom or a hydrocarbon radical of 1 to 10 carbon atoms, a and b are whole numbers of 0 to 3, and c is equal to (4−a−b) and represents a whole number of 1 to 4, and at least one compound of the general formula $$SiR^4{}_n(O-CH_2CH_2-O-CO-(R^7)C=CH_2)_{4-n} \qquad (III)$$

where $R^4$ is a hydrocarbon radical of 1 to 10 carbon atoms optionally having an ether linkage or ester linkage, $R^7$ is a hydrogen atom or a methyl group, and n is a whole number of 0 to 2.

12. A composite composition as claimed in claim 1 wherein the silane compound comprises at least one compound of any of the general formulas $$CH_2=C(R^7)COO(CH_2)_p SiR^8{}_n(OR^6)_{3-n} \qquad (IV)$$

$$CH_2=CHSiR^8{}_n(OR^6)_{3-n} \qquad (V)$$

and

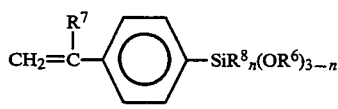

(VII)

where $R^6$ is a hydrogen atom or a hydrocarbon radical of 1 to 10 carbon atoms, $R^7$ is a hydrogen atom or a methyl group, $R^8$ is an alkyl group of 1 to 3 carbon atoms or a phenyl group, n is a whole number of 0 to 2, and p is a whole number of 1 to 6.

13. A composite composition as claimed in claim 1 wherein the silane compound comprises a mixture composed of at least one compound of the general formula $$SiR^4{}_a R^5{}_b(OR^6)_c \qquad (II)$$

where $R^4$ and $R^5$ are alkyl radicals of 1 to 10 carbon atoms or phenyl, optionally having an ether linkage or ester linkage, $R^6$ is a hydrogen atom or a hydrocarbon radical of 1 to 10 carbon atoms, a and b are whole numbers of 0 to 3, and c is equal to (4−a−b) and represents a whole number of 1 to 4, and at least one compound of any of the general formula $$CH_2=C(R^7)COO(CH_2)_p SiR^8{}_n(OR^6)_{3-n} \qquad (IV)$$

$$CH_2=CHSiR^8{}_n(OR^6)_{3-n} \qquad (V)$$

and

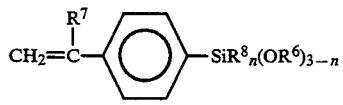

(VII)

where $R^6$ is a hydrogen atom or a hydrocarbon radical of 1 to 10 carbon atoms, $R^7$ is a hydrogen atom or a methyl group, $R^8$ is an alkyl group of 1 to 3 carbon atoms or a phenyl group, n is a whole number of 0 to 2, and p is a whole number of 1 to 6.

14. A process for producing composite compositions which comprises the steps of providing a silica polycondensate (B) formed by hydrolysis and polycondensation of at least one silane compound of the general formula $$SiR^1{}_a R^2{}_b(OR^3)_c \qquad (I)$$

where $R^1$ and $R^2$ are hydrocarbon radicals of i to 10 carbon atoms optionally having an ether linkage, ester linkage or carbon-to-carbon double bond, $R^3$ is a hydrogen atom or a hydrocarbon radical of 1 to 10 carbon atoms optionally having an ether linkage, ester linkage or carbon-to-carbon double bond, a and b are whole numbers of 0 to 3, and c is equal to (4−a−b) and represents a whole number of 1 to 4, in a dispersion system of colloidal silica; preparing a mixed solution by dissolving the silica polycondensate (B) in a radical-polymerizable vinyl compound (A) or a partial polymer thereof; and effecting radical polymerization of the mixed solution.

15. A process for producing composite compositions as claimed in Claim 14 wherein the radical polymerization of the mixed solution is effected at a temperature of 40° to 150° C.

16. A process for producing composite compositions as claimed in claim 14 wherein the mixed solution is prepared by dissolving the silica polycondensate (B) in a solvent, mixing the resulting solution with the component (A), and then distilling off the solvent and water associated with the component (B).

17. A process for producing composite compositions as claimed in claim 14 wherein the mixed solution is prepared by dissolving the silica polycondensate (B) in a solvent to form a solution and adding the component (A) to the solution while distilling off the solvent and water therefrom.

* * * * *